United States Patent [19]

Ganguly et al.

[11] Patent Number: 4,679,934
[45] Date of Patent: Jul. 14, 1987

[54] FIBER OPTIC PYROMETRY WITH LARGE DYNAMIC RANGE

[75] Inventors: Biswa Ganguly, Beavercreek; Larry P. Goss, Dayton; William M. Roquemore, Dayton; Darryl D. Trump, Dayton, all of Ohio

[73] Assignee: The United States of America as represented by the Secretary of the Air Force, Washington, D.C.

[21] Appl. No.: 763,575

[22] Filed: Aug. 8, 1985

[51] Int. Cl.⁴ .................................................. G01J 5/48
[52] U.S. Cl. .......................................... 356/43; 356/45
[58] Field of Search ............................ 356/43, 44, 45; 374/130, 131, 161

[56] References Cited

U.S. PATENT DOCUMENTS

| | | | |
|---|---|---|---|
| 3,222,930 | 12/1965 | Smith | 356/45 |
| 3,486,378 | 12/1969 | Carlson | 73/343 |
| 3,635,088 | 1/1972 | Poncet | 356/45 |
| 4,326,798 | 4/1982 | Kahn | 356/45 |
| 4,362,057 | 12/1982 | Gottlieb et al. | 356/44 |
| 4,367,040 | 1/1983 | Goto | 356/44 |
| 4,376,890 | 4/1983 | Engström et al. | 374/130 |
| 4,409,476 | 10/1983 | Lofgren et al. | 250/277 |
| 4,420,265 | 12/1983 | Everest et al. | 374/133 |
| 4,558,217 | 12/1985 | Alves | 374/161 |

OTHER PUBLICATIONS

R. R. Dils and D. A. Tichenor, "A Fiberoptic Probe for Measuring High Frequency Temperature Fluctuations in Combustion Gases", Sandia Report No. SAND-33-8871, Feb. 1984.
"High Temperature Optical Fiber Thermometry", accufiber informational brochure.

Primary Examiner—R. A. Rosenberger
Assistant Examiner—Crystal D. Cooper
Attorney, Agent, or Firm—Gerald B. Hollins; Donald J. Singer

[57] ABSTRACT

Fiber optic probe apparatus usable for measuring temperatures with increased dynamic range and frequency domain response and desirable measurement accuracy. A black body signal source, fiber optic signal coupling, and extension of the transducer dynamic range with optical multiplexing are employed; the instrument operates in the range of 1.6 micrometers of optical energy wavelength and preferably employs recently improved indium gallium arsenide photodiode transducer devices and transducer frequency domain compensation. Use of the instrument in measuring combustion flame transient temperatures is disclosed.

23 Claims, 5 Drawing Figures

FIBER OPTIC PYROMETRY WITH LARGE DYNAMIC RANGE

RIGHTS OF THE GOVERNMENT

The invention described herein may be manufactured and used by or for the Government of the United States for all governmental purposes without the payment of any royalty.

BACKGROUND OF THE INVENTION

This invention relates to the field of multi-channeled fiber optic temperature measuring instruments and to the use of fiber optic coupled black body transducers in the wide range, rapidly changing measurement of temperatures.

High temperature fiber optic thermometry offers a plausible solution for several complex problems in the temperature measurement art. Among these problems is the measurement of rapidly fluctuating temperatures, as found in a flame; temperature measurement in the presence of strong electromagnetic fields, as in electric furnaces or induction furnaces; temperature measurement in a nuclear radiation environment, and temperature measurement with greater accuracy than afforded by the present-day thermocouple measurement. Fiber optic thermometry also provides new answers for the problems of temperature probe or thermocouple lead heat conduction, temperature probe gas flow disruption, and new approaches to laboratory standard temperature measurements. Fiber optic thermometry is perhaps most importantly, however, one of the most promosing approaches for measuring the temperature transients encountered in a turbulent combustion or sooty combustion atmosphere.

The recent advent of improved solid state phototransducer devices having useful properties in the infrared spectral range and intended principally for use in the fiber optic communications field has added new dimensions to the capability of fiber optic temperature measurement systems. An example of such phototransducer devices is found in the indium gallium arsenide photodiode device currently manufactured by RCA Corporation, and known as the C30980E Photodiode. The C30980E photodiode, which is preferred in the described embodiment of the present invention, is described technically in a data sheet titled "C30979E, C30979EQC, C30980E, C30980EL InGaA$_s$ Photodiodes" which was printed in September 1982 and July 1984 by RCA Corporation and in RCA advertisements such as appear at page 178 of the journal *Laser Focus and Fiberoptic Technology*, April 1982. Such photodiodes are sold by RCA Corporation from a New Products Division Office on New Holland Avenue in Lancaster, PA 17604-3140 and from a Photodetector Marketing Office located at Ste. Anne de Bellevue, Quebec, Canada H9X 3L3. The RCA and similar solid state photoelectric transducer devices which may be or become available from other commercial suppliers have favorable response characteristics in a portion of the infrared spectrum that is desirable for performing temperature measurements.

Improvements in optical temperature measurement have also been recently achieved at the National Bureau of Standards, by R. R. Dils and others, as is exemplified by the Dils articles "High-temperature Optical Thermometer" published in the Journal of Applied Physics, Vol. 54, 1983, p. 1198 and "A Fiberoptic Probe for Measuring High Frequency Temperature Fluctuations in Combustion Gases", Sandia Report 83-8871 published during the first half of 1984 by R. R. Dils and D. A. Tichenor. Both of these Dils publications are hereby incorporated herein by reference.

The patent art includes several examples of high temperature measuring systems which precede the present invention. Included in this patent art is the patent of D. A. Kahn, U.S. Pat. No. 4,326,798, which concerns an optical pyrometer system employing spectral segregation of signal components received from a workpiece being measured, i.e., from a temperature elevated engine turbine blade. The Kahn patent is especially concerned with the avoidance of measurement errors resulting from transient spurious sources of heat in the measurement field, sources such as might be provided by heated particles of carbon in the workpiece atmosphere. Although the Kahn patent teaches the use of such herein employed elements as a beamsplitter, dual optical-to-electrical transducers, dual amplifier channels and the use of a workpiece-inherent black body member, the thrust of the Kahn patent is in the direction of performing accurate measurements in the presence of transient spurious sources of heat and in the elimination of effects from these transient spurious heat sources.

The patent of Folke Lofgren et al, U.S. Pat. No. 4,409,476, concerns a fiber optic temperature measurement arrangement which also includes an optical beamsplitter and a pair of optical-to-electrical transducer elements and additionally includes a photoluminescent black body solid material subjected to the temperature being measured. The photoluminescent material used in the Lofgren patent is in the nature of a semiconductor compound and exhibits the characteristic of responding to excitation by a light source, such as a light emitting diode, by emitting light of a different wavelength—the emitted light wavelength being dependent on the temperature of the semiconductor material. The Lofgren patent contemplates use of optical signals of different spectral content at two photodetector devices. An optical filter is inserted in the path of one or both photodetector devices. The Lofgren patent also contemplates the use of time multiplexing in exciting the light emitting diodes—in order to segregate signals resulting from the different photoluminescent detector devices. The Lofgren patent therefore involves a time multiplexed sensing of photoluminescent materials excited by pulses of light emitting diode light using a beamsplitting arrangement for achieving different spectral responses in the detector unit.

The patent of Kenya Goto, U.S. Pat. No. 4,367,040, concerns a multichannel multiplexed optical temperature measuring system wherein light supplied from an external source such as a laser diode, is transmitted bi-directionally along optical fiber transmission paths to and from a reflection or transmission type of optical sensor. The optical sensors of the Goto apparatus modulate the intensity of the supplied light beam in response to temperature or other physical quantities being measured.

The patent of C. E. Everest, U.S. Pat. No. 4,420,265, concerns an infrared responsive temperature measuring system intended primarily for agricultural applications and having the ability to compensate for sky radiation variations included in the measured signal. The patent of G. J. Carlson, U.S. Pat. No. 3,486,378, also concerns a temperature measuring apparatus wherein two detector cells are multiplexed—with the multiplexing of infrared energy in this case being achieved with a rotating disk modulator and with one of the detectors being excited by an incandescent lamp or other reference light source.

While each of these patents help identify the state of the fiber optic, multiplexed signal, temperature meausurement art preceding the present invention, none of the measurement devices taught by these patents achieve the advantages of dynamic range multiplexing and the other techniques of the present invention.

SUMMARY OF THE INVENTION

An object of the present invention is to provide a fiber optic temperature measuring apparatus of unusual temperature range capability.

Another object of the invention is to provide a fiber optic temperature measuring arrangement wherein plural phototransducers are employed in order to cover a large dynamic range.

Another object of the invention is to provide a fiber optic temperature measurement arrangement wherein the solid state phototransducer devices re reasonably protected from excess optical signal physical damage.

Another object of the invention is to provide a fiber optic temperature measurement arrangement which combines the advantages of a black body thermal transducer with operation in a desirable portion of the infrared spectrum.

Another object of the invention is to provide a fiber optic temperature measurement arrangement which employs the characteristics of newly available photodiode transducer devices to achieve a desirable spectral operating region, a wide dynamic operating range and other advantages.

Another object of the invention is to provide a fiber optic temperature measuring system which minimizes the disadvantages of materials such as sapphire, which have high cost and relatively poor temperature signal conductivity, but are nevertheless needed for desirable high-temperature therml properties.

Another object of the invention is to provide a fiber optic temperature measuring system using the inherent filtering properties of optical coupling members in combination with optical bandpass filtering elements to achieve operation in an unusual and desirable portion of the infrared spectrum.

Another object of the invention is to provide a temperature measuring apparatus of unusual frequency domain response capability.

Another object of the invention is to provide a fiber optic temperature measuring arrangement suitable for use in combustion analysis of turbulent combustion and sooty combustion work environs—environs affording less than ideal temperature measuring conditions.

Additional objects and features of the invention will be understood from the following description and the accompanying drawings.

These and other objects of the invention are achieved by an apparatus providing means for transducing a work environ atmospheric temperature into an intensity modulated black body radiant optical signal, means for selecting a predetermined spectral band of the black body radiant signal as an intensity analog signal representation of the work environ temperature band, means for splitting the intensity analog signal into a plurality of intensity range segregated optical components, means for converting each of the component optical signals into an electrical signal, a plurality of electrical signals each corresponding to a component optical signal resulting, and means for generating a temperature indication signal from selected of the plural electrical signals.

DETAILED DESCRIPTION

Figure 1:
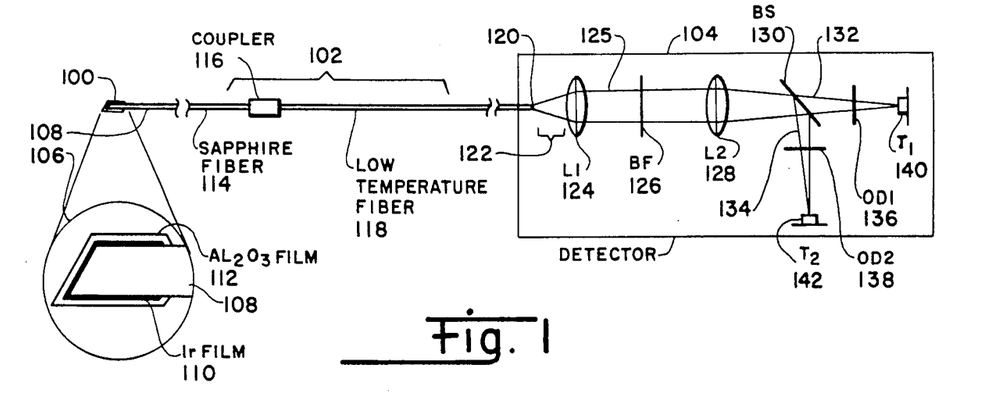
FIG. 1 is a diagram of a fiber optic temperature measuring apparatus made in accordance with the invention.

FIG. 1 of the drawings shows a fiber optic temperature measuring apparatus capable of temperature measurements over an unusually large dynamic range of 1E7 or greater. The principals exhibited in FIG. 1 can be extended to achieve dynamic ranges of even larger value. The notation form 1E7 used herein will be understood to mean 1 times 10 raised to the seventh power, or $1 \times 10^7$. The notation 1E7 is therefore an abbreviation for one times ten raised to the exponent (E) seven and is a notation frequently used in computer programming and similar arts.

The term "dynamic range" in instruments of the FIG. 1 type is understood to mean the ratio of maximum usable signal power to power of the minimum signal discernible in the inherent noise of the instrument; in other words, the ratio of maximum usable signal power to inherent noise signal power. Limited dynamic range has been a characteristic of instruments preceding the FIG. 1 system.

The FIG. 1 apparatus includes three major components, a work environ black body signal source 100, a signal transmitting optical fiber array 102, and a detector assembly 104. Preferred arrangement details of the black body signal source 100 are shown in the expanded view 106 and include black body cavity-shaped radiating member 110 which is surrounded by a protective film layer 112 and received on the end of a high temperature optical fiber member 108.

As indicated in the view 106 in FIG. 1, the black body radiating member 110 is preferably fabricated as an irridium metal film, while the protective film layer 112 is preferably fabricated as an aluminum oxide film, and the optical fiber member 108 is preferably made from a bundle of sapphire (aluminum oxide) fiber elements. Alternates for these preferred materials are of course, possible, and include the use of a platinum metal film for the black body radiating member 110, other oxide materials for the protective film layer 112, and quartz fibers in limited temperature range applications for the sapphire fiber bundle 114. The black body cavity radiating member 110 is preferably formed over the end of the optical fiber bundle 108 by sputtering metal deposition techniques. Other fabrication arrangements including an irridium or tungsten wire disposed in front of the fiber bundle terminal or a mechanically deformed metallic sheet stock member; or alternately, a direct image of flame radiation emission can be used in some applications of the FIG. 1 apparatus.

Optical signals from the black body radiating member 110 are conducted along the sapphire fiber bundle 114 to a low temperature fiber bundle 118. The low temperature fiber bundle 118 is used to conduct signal over the majority of the distance between the black body signal source 100 and the detector assembly 104. Optical signal coupling between the sapphire fiber bundle 114 and the low temperature fiber bundle 118 is accomplished by an optical coupler 116 of a type known in the fiber optic art. The sapphire fiber bundle 114 is of course, employed at the work environ end of the path between the black body signal source 100 and the detector assembly 104 in order to withstand the elevated temperatures existing in the work environ, i.e., the temperatures being measured by the FIG. 1 apparatus. The sapphire fibers in the bundle 114 are capable of withstanding such work environ temperatures, but are undesirably inefficient as conductors of the optical signal generated by the black body source 100; in view of this conduction limitation and the cost of sapphire conductors, the bundle 114 is preferably arranged to be as short as possible.

The optical signal transmitted along the fiber array 102 in FIG. 1 emerges from the end terminus 120 located within the detector assembly 104 as the divergent optical signal indicated at 122. This divergent signal is captured and collimated by the lens L1, 124, which may have a focal length in the range of 2.5 cm. The collimated signal 125 emerging from the lens L1, 124, is captured by a second lens L2, 128, which is preferably of a focal length in the range of 25 cm. The lens L2, 128 serves to focus the collimated light signal 125 on the active surface of a pair of photodiode transducer elements T1, 140, and T2, 142. A bandpass filter BF, 126 is located in the path of the collimated light signal 125 in order to select a specific spectral band of optical signal frequencies for use in the transducer elements T1, 140 and T2, 142. As indicated subsequently herein, the filter 126 together with optical wavelength selective signal attenuation characteristics inherent in the optical fibers 102, can be used to elect a desirable range of the optical spectrum for operating the FIG. 1 apparatus.

In the FIG. 1 apparatus, optical signal from the lens L2, 128 is received on the surface of a pellicle or optical beamsplitting member BS, 130 which preferably has the capability of dividing the optical signal into ten percent and ninety percent intensity ratio components. These components are subsequently converted into electrical signals having different intensity weighting factors. The beam splitter reflected optical signal component 134 preferably represents ten percent of the optical energy incident on the beamsplitting member 130, while the transmitted component 132 represents ninety percent of the beamsplitter received optical energy.

Each of the beamsplitter output components 132 and 134 is further attenuated by a pair of optical density attenuators OD1, 136, and OD2, 138, located intermediate the beamsplitting member 130 and the photodiode transducer elements 140 and 142. The optical path of the reflected ten percent component signal 134 preferably includes an optical density attenuator 138 of attenuation factor between 3 and 3.5, while the optical path of the transmitted component 132 includes an optical density filter of a lesser attenuation factor—between 0.4 and 0.6. (An optical attenuator of attenuation factor or neutral density 3 provides attenuation of 1E3, or $10^3$, while an attenuator of neutral density 4 provides an attenuation of 1E4, or $10^4$.) As a result of the reflected component 134 being only ten percent of the beamsplitting member received optical energy and the attenuation of the density attenuator 138 falling between 1,000 and 10,000, the photodiode transducer element T2, 142 is effectively energized only upon receipt of high intensity optical signals.

The photodiode transducer element T1, 140 by way of receiving the beamsplitter ninety percent component and having relatively small optical attenuation in the optical density attenuator OD1, 136 is responsive to low-level optical signals. During receipt of optical signals of sufficient intensity to activate the transducer element T2, 142, the low level photodiode transducer element T1, 140 is however, protected from physical damage by the presence of the attenuator 136 and its characteristic of attenuating the transmitted optical signal component 132 by a factor of 1E4 to 1E6.

Transducer elements of the preferred solid state type are found generally to have a physical damage threshold in the range of 500 milliwatts of incident optical energy; the optical density filter OD1, 136 is therefore provided with the capability of attenuating the largest expected transmitted signal component 132 to this or a lower level and is principally incorporated in the FIG. 1 apparatus to achieve such protection. Optical-to-electrical transducers of the solid state photodiode type are preferred for use in the FIG. 1 apparatus for inter alia reasons relating to transducer physical damage since the most plausible alternative transducer device, the photomultiplier vacuum tube is found to readily incur photocathode physical damage from incident optical energy in a FIG. 1 type apparatus.

Each of the transducers T1, 140 and T2, 142 in the FIG. 1 apparatus is preferably a type C30980E photodiode supplied by RCA Corporation, or alternately, is a device of similar characteristics from another source. Devices of this type are sold by RCA Corporation in a variety of sizes and configurations, including some arrangements which incorporate light pipes, optical fibers, or preamplifiers. Such devices inherently have good speed of response and quantum efficiencies, however tradeoff among these and other characteristics are indicated in the RCA published device characteristics. Such devices are capable of providing the spectral response indicated in FIG. 3 of the drawings. Transducers or detectors of this type are preferably fabricated from alloys of indium, gallium, and arsenic or indium gallium arsenic/indium phosphide and are described in the above-referenced RCA Corporation data sheet. A series of published articles also describes transducers of this type. Several articles of this nature are to be found in the Institute of Electrical and Electronic Engineers (IEEE) Transactions on Electron Devices and notably in special issues on optoelectronic devices and light emitting diodes and long wavelength photodetectors found at Volume ED-29, Number 9, September 1982 and Volume ED-30, Number 4, April 1983. The paper "Long-Wavelength (1.3 to 1.6 $\mu$m) Detectors for Fiber Optical Communications" by G. E. Stillman, L. W. Cook, G. E. Bulman, N. Tabatabaie, R. Chin, and P. D. Dapkus in the September 1982 transactions publication and the papers "InGaAsP Photodiodes" by E. E. Stillman, L. W. Cook, N. Tabatabaie, G. E. Bulman, and V. M. Robbins found at page 364, and "Large-Area and Visible Response VPE InGaAs Photodiodes" by P. P. Webb and G. H. Olsen found at page 395 of the April 1983 transactions publication are of special interest with respect to such devices. The text of these IEEE special issues is hereby incorporated by reference herein. Detectors of this type can be operated either as a photovoltaic device—an EMF generator, or as a photoconductive device—a variable impedance element. Since the noise related leakage current (and also the transducer output signal response) is lower in the photoconductive mode of operation, this mode of transducer operation is preferred in FIG. 1.

Transducers of this type have principally evolved in response to a need in the fiber optics communications field where signals in the infrared spectral region are coupled between a light emitting diode and a receptor by way of long lengths of fiber optic media. Photodiode transducer elements of this type are capable of operating over a linear dynamic range in the order of 1E4. By way of the 10/90 beamsplitting member 130 and the optical density attenuators 136 and 138 in FIG. 1, two individual linear ranges of 1E4 are stacked or added to provide an overall detector assembly dynamic range in the order of 1E8 in the FIG. 1 apparatus. The beamsplitting member, neutral density attenuator, and multiple transducer element arrangement of the detector 104 in FIG. 1 can be extended to include additional transducer elements and additional operating dynamic range with the inclusion of adequate protection for the most sensitive of the transducer elements. T1, 140 in FIG. 1, for example requires protection from physical damage during receipt of optical signals of the highest contemplated intensity. Generally, however, some difficulty is to be expected in extending the dynamic range of a FIG. 1 type apparatus significantly beyond the 1E8 region in view of the physical damage potential for the low-level or most sensitive of the transducer elements.

The neutral density values of 0.4-0.6 and 3.0-3.5 in FIG. 1 together with the 10% and 90% attenuations of the beamsplitting member 130 effectively divide the optical signal 122 into two components of dynamic range 1E4 each. The optical density attenuators 136 and 138 can be adjusted or selected in order to provide location adjustment of these ranges and to provide the slight degree of range overlap desired between the transducer elements 140 and 142 during receipt of optical signals in the mid-intensity range.

The use of a black body transducer for generating optical signals of large intensity variation, that is, signals affording good temperature resolution characteristics is described in the above-identified 1983 article published by Ray R. Dils. The 1983 Dils article is hereby incorporated by reference into the present specification. The Dils article also indicates that temperature measurement has been based on use of an optical fiber as a signal generator in addition to the herein described use of optical fiber as a signal transmission medium. The use of an optical fiber signal generator in the FIG. 1 apparatus is, of course, within the spirit of the present invention.

By way of explanation, it should be noted that the black body signal source 100 in FIG. 1 may be thought of in the nature of a transducer device, that is, a device which is heated in the work environ and as a result of this heating emits an intensity varying signal usable for measuring the work environ temperature. For the sake of terminology consistency however, the word "transducer" is herein, preferred for use in connection with the photodiode elements 140 and 142 in FIG. 1.

The optical passband of the spectrally selective elements in the FIG. 1 apparatus relates to a notable aspect of the present invention. The desired properties for the bandpass filter 126 and the optical fiber array, the principal other spectrally selective element in the FIG. 1 apparatus, can be appreciated with the assistance of FIGS. 2, 3 and 4 in the drawings. The curves in FIG. 2, for example, show the relationship between spectral radiance or optical signal intensity and optical spectrum wavelength for a black body signal source operated at a series of different temperatures; the FIG. 2 temperatures 201, 203, etc. are measured in degrees Kelvin. FIG. 3 as indicated above shows the relationship between electrical output signal and optical input signal wavelength for the indium gallium arsenide transducer element preferred for use in the transducer element P1, 140 and P2, 142 in FIG. 1. The curves in FIG. 4 of the drawings show the relationship between optical signal wavelength and optical signal attenuation for one type of sapphire opticl fiber usable in the fiber bundle 114 in FIG. 1. The spectral scales 200, 300 and 400 in each of FIGS. 2, 3, and 4 include a desirable portion of the optical spectrum for use in the FIG. 1 apparatus.

Figure 2:
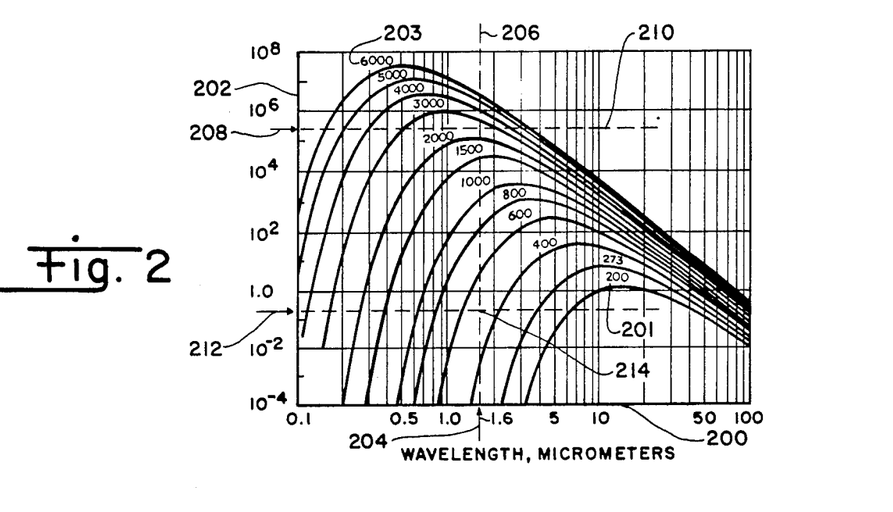
FIG. 2 is a graphic representation of a wavelength versus signal strength tradeoff field controlling operation of the FIG. 1 apparatus.
Figure 3:
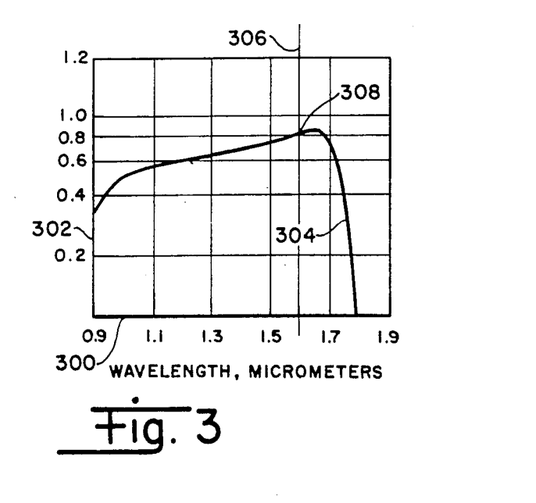
FIG. 3 shows the spectral response of a phototransducer device preferred in the FIG. 1 apparatus.

The spectral radiance or signal output scale 202 in FIG. 2 extends logarithmically over a dynamic range of 1E12. Actually, however, some signal falling outside the range of FIG. 2 are of interest in the present invention, one representation of such signals is included in Table I at the end of this specification. The optical signal wavelength scale 200 in FIG. 2 shows portions of the near and far infrared spectrum also on a logarithmic scale. The black body temperatures in FIG. 2 extend between the 200° K. indicated at 201 and the 6000° K. indicated at 203. An operating band of choice for the FIG. 1 instrument is shown by the dotted lines 204, 208, and 212 in FIG. 2.

One aspect of the FIG. 2 curves concerns the change in optical signal dynamic range which results from operating a black body temperature transducer at different wavelengths along the scale 200—i.e., from limiting the spectral band of interest within the scale 200. At a wavelength of 50 micrometers, for example, the temperatures between 200° K. ajnd 6000° K. involve a signal dynamic range of 1E2, while at a wavelength of 10 micrometers a signal dynamic range slightly under 1E4 is generated. At a wavelength of 3 micrometers moreover, a dynamic range in the neighborhood of 1E9 is required to cover the temperatures between 200° and 6000° K.

In the past, wavelengths in the range of 0.6 to 0.8 micrometers have been employed for fiber optic probe temperature measuring instruments. At these wavelengths, as can be observed in FIG. 2, an optical signal dynamic range capability in the order of $10^{16}$ and $10^{13}$, respectively, is needed in order to measure temperatures between 300° and 2300° K., the temperatures found in a possible turbulent combustion flame. A problem has therefore existed previously in that no known detector was possessed of such large dynamic range capability. In the dynamic range sense, therefore, the large output signal of a black body probe is desirable for achieving good temperature sensitivity and accuracy, but is somewhat troublesome when the need to cover wide temperature ranges is present.

Optical multiplexing as represented by the beamsplitting member 130 in FIG. 1 makes it feasible to overcome the dynamic range problem of a wide temperature range black body transducer signal through splitting the signal into multiple component signals each covering a 1E3–1E4 dynamic range.

Figure 4:
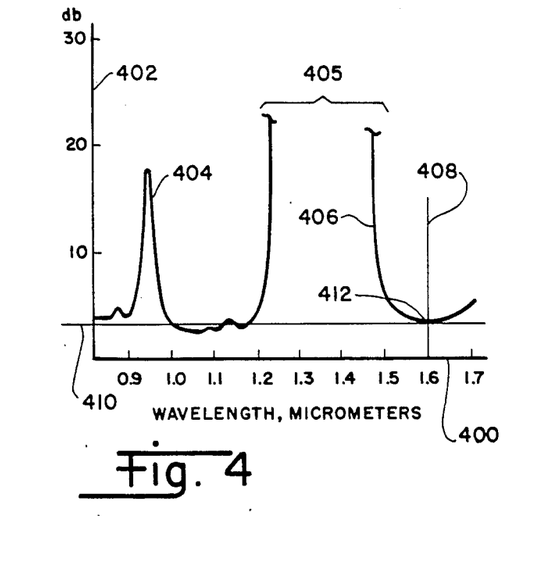
FIG. 4 shows the optical signal attenuation versus optical wavelength characteristics for signal transmitting media usable in the FIG. 1 apparatus.

It can be therefore observed from FIG. 2 that because of dynamic range considerations as well as because of spectral attenuation characteristics discernible in FIG. 4 of the drawings a shift to somewhat longer wavelengths than the previous 0.6 to 0.8 micrometer wavelengths is desirable for a wide range fiber optic optical pyrometer apparatus.

From the combination of optical fiber attenuation characteristics shown in FIG. 4, photodiode transducer characteristics shown in FIG. 3, and blackbody characteristics shown in FIG. 2, an instrument operating in the spectral wavelength region iof 1.6 micrometers can be observed to be desirable. At a 1.6 micrometer spectral wavelength, a dynamic range of 1E8 will cover a temperature range on the order of 400°–2300° K. with some accuracy falloff below 500° K. and will provide measurement feasibility for the variations observed in a turbulent flame combustion atmosphere. The dotted line 206 in FIG. 2 and the arrow 204, indicate the preferred 1.6 micrometer spectral operating wavelength in FIG. 2. The dotted lines 214 and 210, the arrows 212 and 208 show the extent of the signal dynamic range for a 1.6 micrometer spectral wavelength operating point in FIG. 2.

Actual photon flux values in watts for a black body device operated at temperatures between 300° K. and 2300° K. are shown in Table 1 at the end of this specification. As indicated by these photon flux values, a FIG. 1 instrument operated with a center optical spectrum wavelength of 1.6 micrometers involves a signal dynamic range of 1E11 to cover the temperature band of 300° K. to 2300° K. A large part of this dynamic range is, however, devoted to the low, or room temperature, end of this temperature band so that an instrument covering the temperature band of 500° K. to 2300° K. involves a signal dynamic range of 1E6. The herein provided dynamic range of 1E8 therefore allows a lower temperature intermediate these 300° K. and 500° K. values. An instrument operating in the 0.7 micrometer wavelength region in the visible area of the spectrum would require a dynamic range of 1E13 to cover the 300°–2300° K. temperature band; clearly the selected 1.6 micrometer operating frequency and 1E8 dynamic range are preferable for an instrument of moderate sensitivity that is to be capable of measuring over a large range of temperatures.

The scales 300 and 302 in FIG. 3 indicate value of spectral wavelength and relative signal amplitude, respectively, for a preferred indium gallium arsenide photodiode transducer device. The line 306 indicates the location of the preferred 1.6 micrometer spectral operating wavelength and the point 308 in FIG. 3 indicates location of this desired 1.6 micrometer wavelength on the response curve 304 of the preferred indium gallium arsenide photodiode transducer device. Other transducer devices having usable output signal magnitudes in the 1.6 micrometer wavelength region could, of course, be used in the FIG. 1 apparatus as an alternate to the preferred indium gallium arsenide photodiode transducer.

The attenuation response of sapphire fiber elements usable in the high temperature opticl fiber bundle 114 in FIG. 1 is shown in FIG. 4 of the drawings. In FIG. 4, spectral wavelengths are indicated along the scale 400 and attenuation values along the scale 402. In FIG. 4, the attenuation is shown to include two curves 404 and 406 lying on either side of an attenuation peak 405. The attenuation value in decibels is indicated along the scale 402 in FIG. 4 for a specified fiber length, near 1000 meters, of a specific sapphire fiber material. Fibropsil QSF200, which is manufactured by the Saphikon Division of Tyco Laboratories. The curve 406 portion of FIG. 4 and especially the point 412 and the lines 408 and 410 are of interest with respect to the operating point for the FIG. 1 apparatus—these lines and points relate to the 1.6 micrometer preferred wavelength. As indicated by the attenuation values along the scale 402 in FIG. 4, the sapphire fiber bundle portion 114 of the signal transmitting optical fibers 102 in FIG. 1 contributes significantly to attenuation of the optical signal; indeed only the indicated desirable characteristics of the sapphire fibers make use of such fibers attractive in the FIG. 1 apparatus.

The curves in FIG. 4 also indicate that the sapphire fibers in the bundle 114 contribute desirably to the optical wavelength selection achieved in the FIG. 1 apparatus. The curve portion 406 in FIG. 4, for example, indicates sharply increasing optical attenuation in the fiber bundle 114 at wavelengths of 1.5 micrometers and below; this curve actually therefore indicates the sapphire bundle to be a wavelength filter which together with the bandpass filter 126 in FIG. 1 defines the operating spectral region for the FIG. 1 apparatus. The bandpass filter 126 can be of such characteristics as to attenuate optical wavelengths lying outside the sharp attenuations shown in FIG. 4, wavelengths below 1.5 micrometers and above 1.8 micrometers, thereby assuring that only a small spectral band round the 1.6 micrometers is active in the FIG. 1 apparatus. The bandpass filter 126 can also be used to accommodate the presence of undesirably short lengths in the fiber bundle 114—lengths which are too short to achieve the desired optical signal attenuation.

Figure 5:
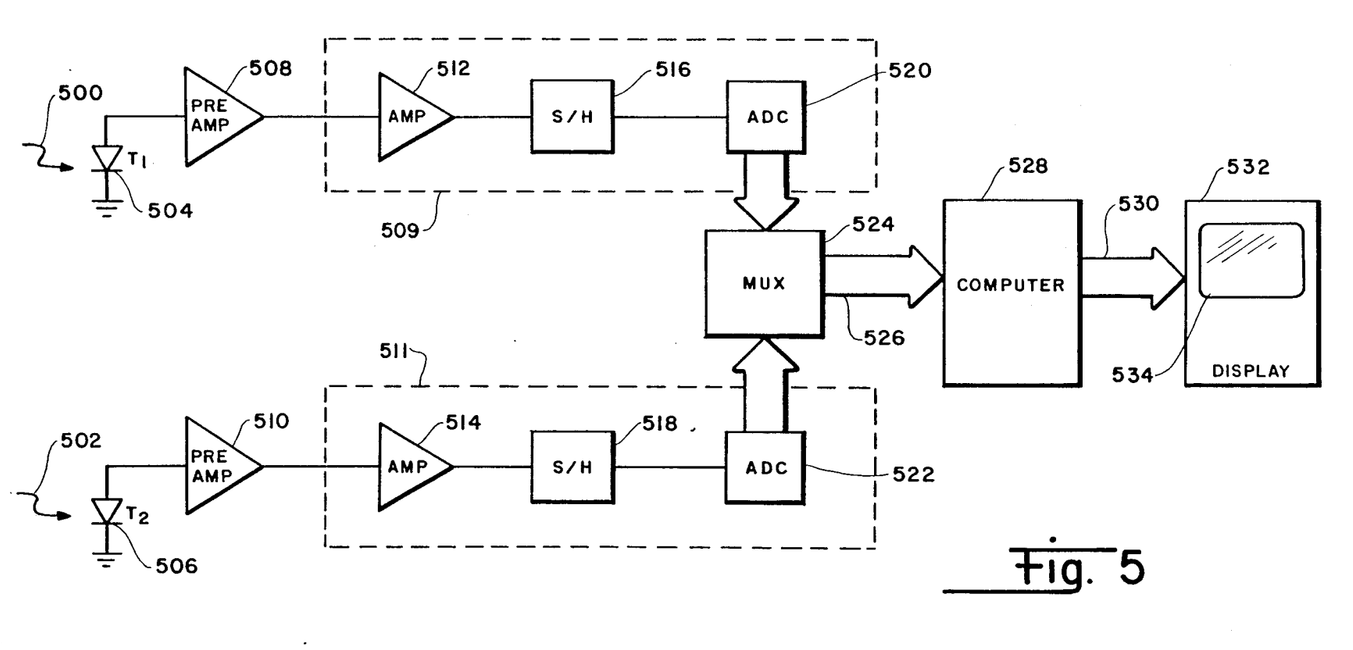
FIG. 5 is a block diagram of an electronic system usable for converting signals from the FIG. 1 apparatus into temperature indications.

FIG. 5 in the drawings shows a block diagram representation of an electronic system usable for processing the electrical signals generated by the photodiode transducer elements T1, 140 and T2, 142 in FIG. 1. These photo transducer elements are represented in electrical form at 504 and 506 in FIG. 5, and are shown symbolically to receive photons of optical energy 500 and 502. The FIG. 5 electronic system includes a pair of electronic signal preamplifiers 508 and 510 which feed the amplifier, sample and hold, and analog-to-digital converter modules 509, 511. The preamplifiers 508 and 510 are preferably of the junction field effect transistor (JFET) type having an input JFET device operated in the trans-impedance circuit configuration with high input impedance and low output impedance. The modules 509 and 511 which include the amplifiers 512 and 512, the sample and hold circuits 516 and 518, and the analog-to-digital converters 520 and 522 are available commercially as integrated circuit devices from suppliers such as Analog Devices, Inc. The modules 509 and 511 can, for example, be data acquisition modules identified as Analog Devices Incorporated part numbers DAS 1156. The sample and hold and analog-to-digital converter combination preferably provides 15 bit resolution with throughput rates in the range of 20 kilohertz for the FIG. 1 apparatus.

Digital signals provided by the analog-to-digital converters 520 and 522 are time sampled by the multiplexer 524 in FIG. 5, and transmitted to a digital computer 528 by way of a data bus 526. The output of the digital computer 528 is transmitted by a second data bus 530 to a display 532 which may include a cathode ray tube 534, or other display arrangements. The display 532 may also include a keyboard for entering operator instructions and display selection information.

Since the two photodiode transducer elements T1, 140 and T2, 142 or their electrical representations at 504 and 506 in FIG. 5 are each responsive to only a predetermined intensity range of signal from the black body source 100, only one of the electrical signals received from these photodiode transducer elements is of interest in making a given temperature measurement. A high temperature work environ measurement producing large intensity signals, for example, will provide a usable, linear operating range, signal from the high temperature photodiode transducer element T2, 142 and also provide a larger but non-linear operating range signal from the low temperature photodiode transducer element T1, 140.

Selection between the signal generated by the photodiode element 506 and the signal generated by the photodiode element 504 is accomplished in the computer 528 in FIG. 5 using a signal amplitude discriminating algorithm. The discriminating algorithm in the computer 528 should provide the following capabilities:

Selection of the signal representing transducer operation within the transducer linear range Exclusion of transducer signals falling above a predetermined linear range of transducer operation Selection of either one or an average of both transducer signals for intermediate intensity signals Exclusion of a transducer signal residing within the transducer noise background level.

A signal amplitude responsive algorithm is satisfactory for performing these selections.

Implementation of a computer algorithm performing these functions is of course, dependent upon the type of computer used at 528 and the operating system and programming language employed with the computer, a program of this type is, in any event within the capability of persons skilled in the computer art.

Dedicated hardware could, of course, be used to replace the computer 528 and the display 532, such hardware would include amplitude discriminating circuitry, data storage devices, and a display in the form of a light emitting diode alphanumeric character matrix or a liquid crystal matrix of the type commonly used in electronic wristwatches. A cathode ray tube display device could also be employed with such a dedicated hardware system. A significant portion of such hardware could also be adapted from commercially available temperature indicating instruments which operate with a thermocouple or other sensing devices.

The frequency domain response of the temperature measuring apparatus in FIG. 1 and FIG. 5 can extend into the kilohertz region and thereby enable use of the apparatus in the measurement of rapidly fluctuating or transient temperature conditions such as may exist in engine combustion, turbulent combustion, or sooty combustion environs. Thermal inertia in the black body signal source 100 and limited thermal conductivity in the optical fiber bundle 114 are the most limiting considerations in determining the frequency domain response of the FIG. 1 and FIG. 5 apparatus. Through the use of a frequency rolloff compensation algorithm in the computer 528, these limitations can be accommodated to a useful degree and enable higher frequency temperature measurement capability than has heretofore been available. Sampling frequency rates up to 20 kilohertz are, for example, achievable with the FIG. 1 and FIG. 5 apparatus. Since the maximum frequency requirement for studying events in a turbulent flame has been found to lie in the region of 10 kilohertz, a 20 kilohertz response is more than adequate for such studies. Notwithstanding this range of overall system response, however, it should be realized that the naked frequency domain response of the black body signal source 100 can have a 250 millisecond time constant; the extension of responses in this range of time constants to the 20 kilohertz region is achieved with the use of frequency domain compensation in the computer 528.

Heretofore, the available photon transducers for the preferred 1.5 to 1.8 micrometers spectral wavelength region have been comprised of germanium, doped germanium, indium antimonide, and lead selinide. The addition of the preferred indium gallium arsenide transducer provides a noise equivalent power output from the transducer which is superior to previous detector types by more than an order of magnitude when measured in the non-cooled or 300° K. temperature environment. The quantum efficiency of indium gallium arsenide is on the order of 60% at the preferred 1.6 micrometer operating wavelength. The indium gallium arsenide photodiode transducer provides junction capacitances comparable to that of silicon PIN detectors and is therefore suitably low for high frequency domain temperature measurement operation.

Calibration of the FIG. 1 and FIG. 5 apparatus to provide absolute temperature measurement may be achieved by calibrating the electro-optical response function with the aid of a black body radiation source. Single point calibration can be used to allow computation of the absolute temperature using a transfer function relationship since the emissivity of irridium or one of the alternate black body materials is substantially temperature independent, as can be seen from the explanation for photon flux vs. temperature below. The FIG. 1 and FIG. 5 apparatus is capable of temperature measurements with resolution and accuracy exceeding 0.5 percent over the selected temperature range.

The use of a black body transducer in order to obtain increased temperature measurement sensitivity is based on a convolution of the optical fiber bandpass characteristics with Planck's black body radiation equation, such a convolution enables the measurement of temperature from a measurement of photon flux arriving at a photodiode transducer element. The applicable Planck equation has the form of $$L(\lambda_o) = \frac{a\epsilon_o c_1}{\lambda^5[\exp(c_2\lambda_o T) - 1]} \; [W/m]$$

where
  $a$ = area of the cavity exit (m²)
  $\epsilon_o$ = apparent emittance of the cavity
  $c_1$ = first radiation constant (3.7418×10⁻¹⁶ W M²)
  $c_2$ = second radiation constant (1.43879×10⁻² m.K)
  $\lambda_o$ = wavelength in vacuum (m)
  T = temperature (K)
  $\lambda_o$ is herein selected to provide maximum temperature change sensitivity and low optical signal absorption in sapphire at elevated temperatures.

While the apparatus and method herein described constitute a preferred embodiment of the invention, it is to be understood that the invention is not limited to this precise form of apparatus or method, and that changes may be made therein without departing from the scope

TABLE I

Black Body Probe Intensity Variation as a Function of Temperature with a Central Wavelength of 1600 nm and Halfwidth of 100 nm; W = Watts.

| T (°K.) | Intensity (W) | T (°K.) | Intensity (W) |
|---|---|---|---|
| 300.0 | 0.32867E−10 | 350.0 | 0.19043E−08 |
| 400.0 | 0.41009E−07 | 450.0 | 0.45345E−06 |
| 500.0 | 0.31322E−05 | 550.0 | 0.15331E−04 |
| 600.0 | 0.57866E−04 | 650.0 | 0.17868E−03 |
| 700.0 | 0.47087E−03 | 750.0 | 0.10926E−02 |
| 800.0 | 0.22857E−02 | 850.0 | 0.43890E−02 |
| 900.0 | 0.78459E−02 | 950.0 | 0.13204E−01 |
| 1000.0 | 0.21107E−01 | 1050.0 | 0.32282E−01 |
| 1100.0 | 0.47525E−01 | 1150.0 | 0.67673E−01 |
| 1200.0 | 0.93596E−01 | 1250.0 | 0.12617E+00 |
| 1300.0 | 0.16624E+00 | 1350.0 | 0.21466E+00 |
| 1400.0 | 0.27221E+00 | 1450.0 | 0.33963E+00 |
| 1500.0 | 0.41759E+00 | 1550.0 | 0.50670E+00 |
| 1600.0 | 0.60750E+00 | 1650.0 | 0.72045E+00 |
| 1700.0 | 0.84593E+00 | 1750.0 | 0.98426E+00 |
| 1800.0 | 0.11357E+01 | 1850.0 | 0.13004E+01 |
| 1900.0 | 0.14784E+01 | 1950.0 | 0.16699E+01 |
| 2000.0 | 0.18748E+01 | 2050.0 | 0.20931E+01 |
| 2100.0 | 0.23247E+01 | 2150.0 | 0.25694E+01 |
| 2200.0 | 0.26270E+01 | 2250.0 | 0.30973E+01 |
| 2300.0 | 0.33802E+01 | | |

We claim:

1. Large temperature range optical pyrometer apparatus comprising:
   optical beamsplitting means for segregating photon flux optical signals into first and second component optical signals of predetermined segregated intensity range ratio;
   optic means for transmitting photon flux optical transmission signals from adjacent an elevated temperature work environ to said beamsplitting means;
   first optical attenuation means for generating from said first component optical signal a first attenuated optical signal of first intensity ratio relationship with said first component optical signal;
   second optical attenuation means for generating from said second component optical signal a second attenuated optical signal of second intensity ratio relationship with said second component optical signal;
   first optical-to-electrical transducer means, of smaller dynamic range capability than said photon flux energy optical signal, for generating first electrical signals amplitude responsive to said first attenuated optical signal intensity;
   second optical-to-electrical transducer means of smaller dynamic range capability than said photon flux energy optical signal, for generating second electrical signals amplitude responsive to said second attenuated optical signal intensity; and
   means responsive to the amplitude of a selected one of said first and second electrical signals for generating a pyrometer output temperature indication signal.

2. The apparatus of claim 1 further including optical filter means for limiting the spectrum of said first and second attenuated optical signals to a predetermined spectral band.

3. The apparatus of claim 2 wherein said optical filter means includes a limiting spectral response in said optic transmission means.

4. The apparatus of claim 3 wherein said optic transmission means limiting spectral response lies on one spectral wavelength side of said predetermined spectral band and said optical filter means further includes an optical filter element of limited spectral response lying on the opposite spectral wavelength side of said predetermined spectral band.

5. The apparatus of claim 4 wherein said spectral band includes the spectral wavelength of 1.6 micrometers.

6. The apparatus of claim 1 further including a black body transducer element located within said work environ intermediate said environ and a work environ terminus of said optic means.

7. The apparatus of claim 6 wherein said black body transducer element is comprised of a metal taken from the group of platinum and irridium.

8. The apparatus of claim 7 wherein said black body transducer element includes a protective film of oxide material disposed over the metal surface adjacent said work environ.

9. The apparatus of claim 1 wherein said optic transmission means includes a transmission element comprised of sapphire.

10. The apparatus of claim 9 wherein said optic transmission means includes a high temperature sapphire transmission element adjacent said work environ and low temperature fiber optic means intermediate said sapphire transmission element and said beamsplitting means.

11. The apparatus of claim 1 wherein said first and second optical-to-electrical transducer means each include a transducer element comprised of indium gallium arsenide.

12. The apparatus of claim 1 wherein said means for generating a pyrometer output temperature indication signal includes selection means responsive to the amplitude of said first and second electrical signals for selecting between said electrical signals in generating said pyrometer output indication signal.

13. The apparatus of claim 1 wherein said beamsplitting means includes a beamsplitting pellicle member,
   said first component signal is transmitted through said pellicle member, said second component optical signal is reflected from said pellicle member and said second component reflected optical signal is of lesser intensity than said first component transmitted optical signal;
   whereby said transmitted first component signal correlates with a low intensity, low temperature portion of the dynamic range of said pyrometer and said reflected second component signal, correlates with a high intensity high temperature portion of said dynamic range of said pyrometer.

14. The apparatus of claim 13 wherein said first optical attenuation means is of smaller attenuation capability than said second optical attenuation means;
   whereby said second lower intensity component optical signal is attenuated by a greater degree than said first component optical signal and the portions of said pyrometer dynamic range correlating with said component signals are further segregated.

15. The apparatus of claim 2 wherein said spectral band is located at a spectral wavelength of limited optical signal intensity dynamic range.

16. The apparatus of claim 15 wherein said optical-to-electrical transducer means includes a transducer element comprised of indium, gallium, and arsenic, said selected spectral band includes the wavelength of 1.6 micrometers, one of said attenuation means is capable of attenuation greater than one thousand times and the other of said attenuation means is capable of attenuation less than one hundred times.

17. The method for optically measuring a wide band of work environ temperatures comprising the steps of:
   transducing a work environ temperature into an intensity modulated black body radiance optical signal;
   selecting a predetermined spectral band of said black body radiance signal as an intensity signal representation of said work environ temperature band;
   splitting said intensity signal into a plurality of intensity range segregated optical signal components;
   converting each of said component optical signals into an electrical signal, a plurality of said electrical signals each corresponding to a component optical signal and representing a range of work environ temperatures thereby resulting; and
   generating a temperature indication signal from a selected sequence of said plural electrical signals.

18. The method of claim 17 further including attenuating each of said component optical signals by a differing predetermined amount in inverse correspondence with said segregated intensity ranges;
   whereby the dynamic range of each said component signal converted into an electrical signal is similar and within the linear dynamic range of means performing said converting.

19. The method of claim 17 wherein said step of selecting a predetermined spectral band includes rejecting the black body spectral band of maximum signal dynamic range:
   whereby optical signals of large dynamic range and transducer physical damage capability are excluded from said converting step and limited dynamic range converting is enabled.

20. The method of claim 19 wherein said step of splitting said intensity signal into a plurality of signal components comprises splitting said intensity signal into two signal components of dissimilar intensity range.

21. Apparatus for optically measuring a wide band of work environ temperatures comprising:
   means for transducing a work environ temperature into an intensity modulated black body radiance optical signal;
   means for selecting a predetermined spectral band of said black body radiance signal as an intensity analog signal representation of said work environ temperature band;
   means for splitting said intensity analog signal into a plurality of intensity range segregated optical signal components;
   means for converting each of said component optical signals into an electrical signal, a plurality of electrical signals each corresponding to a component optical signal resulting; and
   means for generating a temperature indication signal from selected of said plural electrical signals.

22. Apparatus for optically measuring fluctuating work environ temperatures in the range of 500 to 2300 degrees Kelvin comprising:
   an irridium black body transducer member capable of being immersed in said work environ and of generating a black body radiance signal when heated by said environ;
   an optical beamsplitter member capable of dividing a radiance signal sample into ten and ninety percent intensity components;
   an optical transmission member including optically coupled sapphire fiber and glass fiber portions located intermediate said work environ and said beamsplitting members respectively, and capable of transmitting optical radiance signal samples therebetween;
   optical filter means located in the path of said optical radiance signal sample for rejecting radiance signal spectral components external of a band between 1.5 and 1.8 micrometers of spectral wavelength;
   a first neutral density attenuation member of density factor between four-tenths and six-tenths located in the ninety percent intensity component path of said beamsplitter;
   a second neutral density attenuation member of density between three and three and one-half located in the ten percent intensity component path of said beamsplitter;
   a first optical signal to electrical signal detector member comprised of a room temperature maintained gallium indium and arsenic compound photodiode capable of converting said four-tenths to six-tenths density attenuated beamsplitter ninety percent component into a first electrical signa; said detector member diode having a linear dynamic transducer range between 1E5 and 1E6;
   a second optical signal to electrical signal detector member comprised of a room temperature maintained gallium indium and arsenic compound photodiode and capable of converting said three to three and one-half density attenuated beamsplitter ten percent component into a second electrical signal, said detector member diode having a linear dynamic transducer range between 1E5 and 1E6; and
   means responsive to a selected one of said first and second electrical signals for generating a measured temperature indication.

23. The apparatus of claim 22 wherein said optical filter means is comprised of a first limited spectral passband residing in said optical transmission member and a filter member of second limited spectral passband.

* * * * *

UNITED STATES PATENT AND TRADEMARK OFFICE
CERTIFICATE OF CORRECTION

PATENT NO. : 4,679,934

DATED : July 14, 1987

INVENTOR(S) : Biswa Ganguly et al

It is certified that error appears in the above-identified patent and that said Letters Patent is hereby corrected as shown below:

Col 1, line 33, "promosing" should be --promising--.

Col 3, line 23, "re" should be --are--.

Col 8, line 17, "opticl" should be --optical--.

Col 8, line 23, "signal" should be --signals--.

Col 9, line 62, "opticl" should be --optical--.

Col 10, line 52, "512" should be --514--.

Claim 1, line 7, left out word "transmission" after the word "optics".

Claim 1, line 7 and 8, "transmission" should not be in that place.

Claim 22, line 34, "signa;" should be --signal--.

Signed and Sealed this

Sixteenth Day of February, 1988

*Attest:*

DONALD J. QUIGG

*Attesting Officer*  Commissioner of Patents and Trademarks